(12) United States Patent
Marenco et al.

(10) Patent No.: US 11,299,172 B2
(45) Date of Patent: Apr. 12, 2022

(54) AUTOMOTIVE AUTONOMOUS DRIVING TO PERFORM COMPLEX RECURRENT LOW SPEED MANOEUVRES

(71) Applicant: C.R.F. SOCIETA' CONSORTILE PER AZIONI, Orbassano (IT)

(72) Inventors: Silvano Marenco, Orbassano (IT); Stefano Mangosio, Orbassano (IT); Massimo Fossanetti, Orbassano (IT); Andrea Saroldi, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 133 days.

(21) Appl. No.: 16/498,624

(22) PCT Filed: Mar. 6, 2019

(86) PCT No.: PCT/IB2019/051809
§ 371 (c)(1),
(2) Date: Sep. 27, 2019

(87) PCT Pub. No.: WO2019/171292
PCT Pub. Date: Sep. 12, 2019

(65) Prior Publication Data
US 2021/0284183 A1    Sep. 16, 2021

(30) Foreign Application Priority Data

Mar. 6, 2018  (IT) .......................... 102018000003312

(51) Int. Cl.
*B60W 50/06* (2006.01)
*B60W 60/00* (2020.01)
(Continued)

(52) U.S. Cl.
CPC ........... *B60W 50/06* (2013.01); *B60R 16/023* (2013.01); *B60W 10/04* (2013.01); *B60W 10/18* (2013.01);
(Continued)

(58) Field of Classification Search
CPC .................................................... B60W 50/06
See application file for complete search history.

(56) References Cited

U.S. PATENT DOCUMENTS 6,483,429 B1 * 11/2002 Yasui ..................... B60Q 9/005
340/435
10,331,141 B2 * 6/2019 Grimm ................ G05D 1/0214
(Continued)

FOREIGN PATENT DOCUMENTS

AU      2014274970 A1 * 12/2015 ............ H04W 4/029
CA         2720892 A1 *  5/2012 ............. A61B 5/168
(Continued)

OTHER PUBLICATIONS https://www.lexico.com/en/definition/prompt2.2Computing (of a computer) request input from (a user) (Year: 2021).*
(Continued)

*Primary Examiner* — Shelley Chen
(74) *Attorney, Agent, or Firm* — Harness, Dickey & Pierce, P.L.C.

(57) ABSTRACT

An automotive autonomous driving system comprising automotive on-board systems comprising a propulsion system, a braking system, a steering system, and a sensory system, an automotive user interface, and an automotive electronic control unit connected to, via an automotive on-board communications network, and configured to cooperate with, the automotive on-board systems and the automotive user interface to provide an automotive autonomous driving system. The automotive electronic control unit is
(Continued)

further configured to store and populate a database of recurrent low speed manoeuvres and cause recurrent low speed manoeuvres stored in the database of recurrent low speed manoeuvres to be repeated in autonomous driving mode.

13 Claims, 3 Drawing Sheets

(51) Int. Cl.
*B60R 16/023* (2006.01)
*B60W 10/04* (2006.01)
*B60W 10/18* (2012.01)
*B60W 10/20* (2006.01)
*B60W 30/18* (2012.01)
*B60W 50/14* (2020.01)
*G01C 21/34* (2006.01)

(52) U.S. Cl.
CPC ...... *B60W 10/20* (2013.01); *B60W 30/18009* (2013.01); *B60W 50/14* (2013.01); *B60W 60/001* (2020.02); *G01C 21/3407* (2013.01); *B60W 2050/146* (2013.01); *B60W 2520/10* (2013.01); *B60W 2520/125* (2013.01); *B60W 2552/15* (2020.02); *B60W 2554/80* (2020.02)

(56) References Cited

U.S. PATENT DOCUMENTS

| | | | |
|---|---|---|---|
| 10,379,538 B1* | 8/2019 | Sheckells | B60W 60/0011 |
| 10,384,684 B2* | 8/2019 | Sogen | B60W 40/072 |
| 10,745,006 B2* | 8/2020 | Grimm | B60W 50/06 |
| 11,216,888 B2* | 1/2022 | Perl | G07C 5/08 |
| 2006/0178823 A1* | 8/2006 | Eglington | G05D 1/0278 701/414 |
| 2007/0225882 A1* | 9/2007 | Yamaguchi | B60W 30/095 701/36 |
| 2011/0082613 A1* | 4/2011 | Oetiker | B60W 10/20 701/25 |
| 2011/0246156 A1* | 10/2011 | Zecha | G06K 9/00342 703/6 |
| 2015/0354978 A1* | 12/2015 | Gerlach | G06N 7/005 701/424 |
| 2018/0011494 A1* | 1/2018 | Zhu | B60W 10/18 |
| 2018/0056991 A1* | 3/2018 | Sogen | G05D 1/0214 |
| 2019/0077458 A1* | 3/2019 | Khlifi | B62D 15/0265 |
| 2019/0232955 A1* | 8/2019 | Grimm | B60W 50/06 |
| 2019/0272665 A1* | 9/2019 | X | G06T 15/08 |
| 2019/0375418 A1* | 12/2019 | Shimizu | B60W 40/072 |
| 2020/0238978 A1* | 7/2020 | Suzuki | B60W 60/0051 |

FOREIGN PATENT DOCUMENTS

| | | | | |
|---|---|---|---|---|
| CN | 107688894 A | * | 2/2018 | B60W 40/09 |
| DE | 202014006923 U1 | * | 11/2015 | B60W 30/12 |
| JP | 2004199287 A | * | 7/2004 | G09B 19/167 |

OTHER PUBLICATIONS

International Search Report and Written Opinion issued in PCT/IB2019/051809, dated Jun. 25, 2019; ISA/EP.

* cited by examiner

AUTOMOTIVE AUTONOMOUS DRIVING TO PERFORM COMPLEX RECURRENT LOW SPEED MANOEUVRES

CROSS-REFERENCE TO RELATED APPLICATIONS

This application is a U.S. National Phase Application under 35 U.S.C. 371 of International Application No. PCT/IB2019/051809, filed on Mar. 6, 2019, which claims the benefit of Italian Patent Application No. 102018000003312 filed on Mar. 6, 2018. The entire disclosures of the above-identified applications are incorporated herein by reference.

TECHNICAL FIELD OF THE INVENTION

The present invention generally relates to automotive driving assistance, and particularly to performance of complex recurrent low speed manoeuvres in autonomous driving mode.

The present invention finds application in any type of road motor vehicle, whether it is used to transport people, such as a car, a bus, a camper van, etc., or to transport goods, such as an industrial vehicle (a truck, lorry, articulated vehicle, etc.) or a light or medium-heavy commercial vehicle (a van, covered body vehicle, cabin cruiser, etc.).

STATE OF THE ART

As is known, in recent years car manufacturers have invested considerable resources in researching advanced motor vehicle driving assistance/aid systems (Advanced Driver Assistance Systems ADAS) to improve driving safety and comfort, For this reason and due to the fact that they will help achieve the goals set by the European Union for reducing road accidents, ADAS are one of the fastest growing segments in the automotive sector and bound to become increasingly popular in the years to come.

ADAS safety features are designed to avoid collisions and accidents by offering technologies that warn drivers of potential problems, or to avoid collisions by implementing safeguard measures and taking control of the motor vehicles. Adaptive features can automate lighting, provide adaptive cruise control, automate braking, incorporate GPS/traffic signalling, connect smartphones, alert drivers of other motor vehicles of hazards, keep drivers in the right lane, or show what is in blind spots.

ADAS technology is based on vision/camera systems, sensory systems, automotive data networks, vehicle-to-vehicle (V2V) or vehicle-to-infrastructure (V2I) communication systems. Next-generation ADAS systems will increasingly take advantage of wireless connectivity to offer added value to V2V or V2I communication.

According to studies conducted by the Accident Research of the German Association of Insurers (GDV), in fact, lane departure warning systems alone are able to prevent up to 15% of road accidents, while assistance at intersections can avoid up to 35% of road accidents.

Technological developments such as radar and camera integration, and the fusion of sensory data from multiple applications, are expected to bring about a change in motor vehicles that will be more substantial over the next two decades than it has been in the 130 years that have elapsed since the first motor vehicle saw the light of day.

The end-point of these technological developments is usually defined as self-driving cars or autonomous cars.

The two terms are overwhelmingly most often used interchangeably, as in the present discussion, whereas, instead, in some specialized environments these two terms are used differently to make subtle distinctions.

In particular, the term autonomous cars was used to indicate those cars that resemble today's cars, i.e. with the seats facing forward and a steering wheel, and wherein the driver is deprived of driving tasks only in certain circumstances, for example for self-parking or self-braking or for Adaptive Cruise Control to adjust the speed so as to maintain a safe distance from the cars ahead. In the near future, autonomous cars could take total control of the driving in heavy traffic or on motorways.

The term self-driving cars has instead been used to indicate those cars that are considered to represent a step forward compared to autonomous cars, i.e. cars in which the steering wheel will completely disappear, and which will make the whole trip by using the same sensory system used by autonomous cars.

Disregarding this subtle distinction, the true distinction is between assisted driving motor vehicles, where the motor vehicle "assists" the driver (who is therefore not exempt from paying attention), by braking if the vehicle in front brakes, slowing down when required, and so on, and automatic or automated driving motor vehicles, where the motor vehicle, unlike the above one, drives fully autonomously and the driver may not pay attention.

An example of this terminological distinction is given by the article by Wood et al, (2012), in which the author writes: "This article generally uses the term autonomous instead of the term automated. The term "autonomous" was chosen "because it is the term that is currently in more widespread use (and thus is more familiar to the general public). However, the term "automated" is arguably more accurate as it connotes control or operation by a machine, while "autonomous" connotes acting alone or independently. Currently, most vehicles (which do not know they have a person in the seat), use communication with the Cloud, or with other vehicles, and do not enter the destination independently. This is why the term "automated" would be better to describe this vehicle concept".

In 2014, SAE (Society of Automotive Engineers) International, a standardization body in the aerospace, automotive and vehicle industry that works on developing and defining engineering standards for motorized vehicles of all kinds, including cars, trucks, ships and aircraft, published a new International Standard J3016, which defined six different levels for automatic driving. This classification is based on how much the driver has to intervene on the motor vehicle, rather than on the motor vehicle's capabilities.

The six levels of automatic driving are:

Level 0—No automation: The driver must take care of all driving aspects, with no electronic support;

Level 1—Driver assistance: The driver must take care of all driving aspects, but is supported with information (in the form of visual or acoustic alerts) by electronic systems that can signal the presence of dangerous situations or adverse conditions. At this level, the car merely analyses and represents the situations, thus the driver has total and full responsibility for driving the vehicle;

Level 2—Partial automation: The driver takes care of the driving, but there is a first driving integration. At this level, the motor vehicle intervenes in acceleration and braking through safety systems, such as for example brake assist and anti-collision emergency braking. The direction and traffic control are still under the control of the driver, although in certain scenarios with clearly visible road surface marking, the steering can be managed in a partially automated way (systems called Lane Keeping Assist, and in the most complete versions Traffic Jam Assist, Autosteer, Highway Assist, depending on the car brand);

Level 3—Conditional automation: the motor vehicle is able to manage the driving in ordinary environmental conditions, managing acceleration, braking and direction, while the driver intervenes in problematic situations in the event of a system request or if the driver himself/herself verifies adverse conditions;

Level 4—High automation: The automatic system is able to manage any eventuality, but must not be activated in extreme driving conditions as in case of bad weather;

Level 5—Full automation: The automatic driving system is able to manage all situations that can be managed by humans, without any human intervention.

US 2018/011494 A1 discloses a planning control method based on standard scenes for the operation of autonomous motor vehicles. In one embodiment, planning and movement control data is received, which indicates that an autonomous motor vehicle must move from a first point to a second point of a path within a predetermined path. In response to the planning and movement control data, the path from the first point to the second point is segmented into multiple path segments. For each of the path segments, one of the predetermined driving scenes is identified, which corresponds to the movement characteristics of the corresponding path segment. The planning and movement control data associated with the path segments is modified according to predetermined movement settings of the path segments. The autonomous motor vehicle is driven across the path segments according to the modified planning and movement control data.

US 2015/354978 Si discloses a method of predicting a path and a destination of a motor vehicle based on situational awareness and comprising the steps of receiving data on the motor vehicle including at least one current position and one current time from a plurality of sensors, determining a plurality of usage scenarios based on the motor vehicle data, accessing historical data on the motor vehicle and user data stored in a database, assigning a probability value to each one of the plurality of usage scenarios based on the motor vehicle data, and predicting a set of destinations and paths for each one of the plurality of usage scenarios.

US 2006/178823 A1 discloses a system for extending the driving paths of agricultural vehicles which have variable curvature along their length. The system provides precision driving of agricultural vehicles along a series of adjacent paths so as to form rows for cultivating a field. The vehicle is moved along a first path while receiving positioning information from a navigation system, for example a RTK GPS. This positioning information is stored in a processor and is used by the processor to calculate a second path adjacent to the first path by calculating offsets perpendicular to sections of the first path in multiple positions along the first path. The offset process is repeated to calculate a third path and subsequent paths so as to cover the field. Thanks to the offset process, the field can be covered with paths having variable curvature along their length, yet substantially providing no gaps or overlaps in the field covering. The system can propose alternative paths and the user can intervene by steering the agricultural vehicle or using a graphical user interface to select among the alternative paths. The paths that allow the field to be covered can be stored in the form of a model, which can be used to make the agricultural vehicle steer automatically along a previously calculated path in subsequent operations on the field and in subsequent years.

US 2011/082613 A1 discloses a device for controlling the steering of a motor vehicle during a parking manoeuvre. For this purpose, the selected parking space for parking the motor vehicle is first monitored and, based on the monitoring results, an orientation field is prepared which defines an orientation of destination for a plurality of positioning points within the selected parking space and near the selected parking space. The motor vehicle is then driven along these positioning points, starting from any arbitrary point within the orientation field, to the point of destination of the parking manoeuvre. The control of the motor vehicle takes place by comparing the respective current orientation of the motor vehicle with the specific orientation of destination for the respective position in the orientation field and by appropriately adjusting the steering angle from the orientation of the motor vehicle to the orientation of destination.

OBJECT AND SUMMARY OF THE INVENTION

The Applicant has found that due to the presence of obstacles and surrounding motor vehicles, when moving in traffic a motor vehicle always travels different paths that are not predictable or programmable a priori, even when it has to reach the same destination via the same route, whereas "controlled" situations exist, typically within localized, private or protected areas (or in any case with limited and controlled access), where a motor vehicle travels at low speed one or more predetermined paths or trajectories, which are always the same, and where the presence of obstacles (for example other surrounding vehicles), which could force the motor vehicle to modify its trajectory, is limited (if any).

For example, in a courtyard of a house, a motor vehicle travels several times the same path at low speed from a first point, for example an entrance gate, to a second point, for example a garage; or, in a loading/unloading area of a cluster of warehouses, a motor vehicle travels a plurality of predetermined paths from an entrance point to reach a loading/unloading point of a respective warehouse (a so-called "docking" manoeuvre); yet further, in a parking lot, a motor vehicle typically travels along predefined trajectories to go from an entrance point to a given parking area.

Currently, in the above-described situations, the motor vehicle's driver must typically perform the same manoeuvres repeatedly to reach the desired destinations travelling the predefined paths. Furthermore, the motor vehicle's driver, if he/she is unfamiliar with the configuration of the controlled area, often he/she finds it difficult to reach his/her destination; a typical example is the difficulty of finding a free space in a public or private car park, or an assigned unloading area in a freight loading/unloading area.

In general, there is a clear risk of faulty manoeuvres which can lead to a considerable waste of time, all the more if consideration is given to the fact that it can be demonstrated that the driver's attention typically decreases during routine manoeuvres.

To perform low-speed manoeuvres, as early as in 2008 the Applicant proposed in EP 2 136 275 B1 an automotive autonomous driving system, in which an automotive electronic control unit, implemented a self-learning path procedure which causes the automatic storage of driving data of the motor vehicle while travelling the path under the manual control of a motor vehicle's driver.

The object of the present invention is hence to provide a technology which makes exploitation of the automotive autonomous driving technology as user-friendly as possible to perform complex or demanding recurrent low-speed, manoeuvres.

Therefore, according to the present invention, an automotive electronic control unit, an automotive autonomous driving system, and a motor vehicle are provided, as claimed in the appended claims.

DESCRIPTION OF PREFERRED EMBODIMENTS OF THE INVENTION

The present invention will now be described in detail with reference to the accompanying drawings in order to allow a skilled person to implement it and use it. Various modifications to the described embodiments will be readily apparent to those of skill in the art and the general principles described may be applied to other embodiments and applications without however departing from the protective scope of the present invention as defined in the appended claims. Therefore, the present invention should not be regarded as limited to the embodiments described and illustrated herein, but should be allowed the broadest protection scope consistent with the features described and claimed herein.

Unless otherwise defined, all technical and scientific terms used herein have the same meaning commonly understood by one of ordinary skill in the art to which the invention belongs. In case of conflict, the present specification, including the definitions provided, will control. Furthermore, the examples are provided for illustrative purposes only and as such should not be considered limiting.

In particular, the block diagrams included in the attached figures and described below are not to be understood as a representation of the structural features, i.e. constructional limitations, but must be understood as a representation of functional features, i.e. intrinsic properties of the devices defined by the effects obtained, that is to say functional restrictions, which can be implemented in different ways, so as to protect the functionalities thereof (operational capability).

In order to facilitate the understanding of the embodiments described herein, reference will be made to some specific embodiments and a specific language will be used to describe the same. The terminology used herein is used for the purpose of describing particular embodiments only, and is not intended to limit the scope of the present invention.

Figure 1:
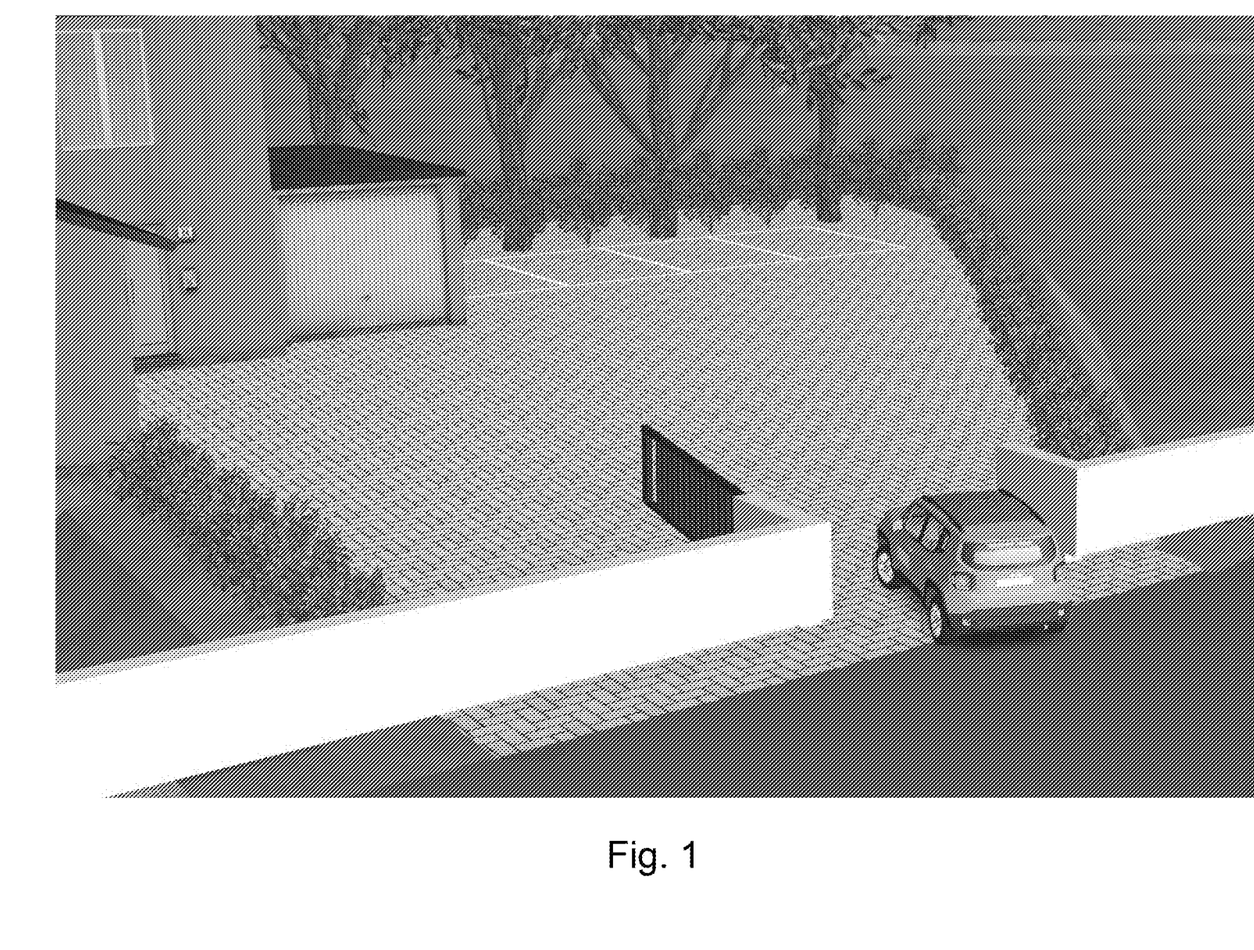
FIG. 1 shows a typical scenario of a possible exploitation of the automotive autonomous driving to perform recurrent low speed manoeuvres.

FIG. 1 schematically shows a typical scenario of a possible exploitation of the automotive autonomous driving technology to park the motor vehicle in a garage.

Figure 2:
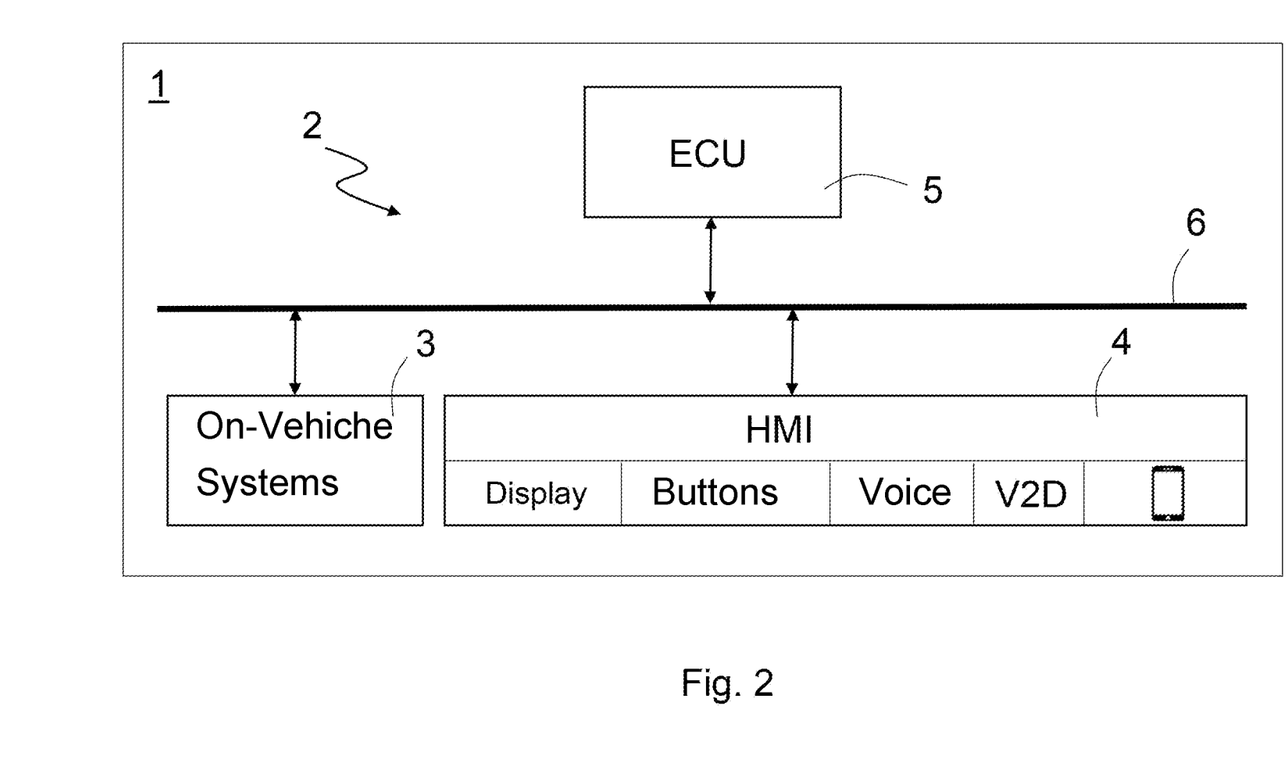
FIG. 2 shows a block diagram of an automotive autonomous driving system to perform recurrent low speed manoeuvres.

FIG. 2 shows a block diagram of an automotive autonomous driving system, referenced as a whole with the reference numeral 1, designed to cause a motor vehicle, referenced with reference numeral 2, to perform recurrent low speed manoeuvres in autonomous driving mode.

As shown in FIG. 2, the automotive autonomous driving system 1 comprises:

automotive on-board systems 3, of which only those involved in the implementation of the present invention will be described below, including, inter cilia, a propulsion system, a braking system, a steering system, an infotainment system, and a sensory system designed to detect motor-vehicle-related quantities 2 comprising, by way of example, wheel angle, steering wheel angle, yaw, longitudinal and lateral acceleration, location, etc., an automotive user interface 4 (HMI—Human Machine Interface) through which the occupants of the motor vehicle 2 may interact with the automotive autonomous driving system 1, and an automotive electronic control unit (ECU) 5 operatively connected to the automotive on-board systems 3 and the automotive user interface 4 via an automotive on-board communication network 6, such as CAN, FlexRAy or others, and designed to store and execute an autonomous driving software comprising software instructions which, when executed, cause the electronic control unit 5 to become configured to cooperate with the automotive on-board systems 3 to provide the automotive autonomous driving system 1, which allows automotive recurrent low speed manoeuvres to be performable in autonomous driving mode.

In order to allow the occupants of the motor vehicle 2 to interact with the automotive autonomous driving system it, the automotive user interface 4 includes:

an on-board display, selection and activation buttons of a hard type, typically arranged on a steering wheel (not shown) of the motor vehicle, and/or of soft type, i.e., displayed on the on-board display, a voice recognition system (optional), portable (hand-held) or wearable personal mobile electronic communications devices, such as smartphones, phablets, tablets, personal computers, smartwatches, etc., of the occupants of the motor vehicle 2, on which a software application may be stored and executed, which is specially designed to cause personal mobile electronic communications devices to communicate with an automotive infotainment system and with the automotive autonomous driving system 1, and a short-range, bidirectional wireless communications system, hereinafter referred to as "V2D" communications system, an acronym for Vehicle-to-Device, which is operable to detect and identify within its range of communication short-range, bidirectional wireless communication systems of personal mobile electronic communications devices on board the motor vehicle 2, hereinafter referred to as "D2V" communications systems, an acronym for Device-to-Vehicle, and to establish communications and communicate with the detected and identified D2V communication systems, possibly after an appropriate pairing procedure, if needed.

The automotive user interface 4 is configured to receive commands imparted by the driver of the motor vehicle 2 and comprising, by way of example, a command to start a stored recurrent low speed manoeuvre, a command to select a stored recurrent low speed manoeuvre, etc., and/or to inform the driver of the motor vehicle 2 about the degree of progress of a stored recurrent low speed manoeuvre and about operating parameters of the motor vehicle 2; and/or to request intervention of the driver of the motor vehicle 2, for example to stop the motor vehicle 2 or engaging the reverse gear, when the recurrent low speed manoeuvre is only partially performed through autonomous driving. Requests for intervention and information may be provided to the driver of the motor vehicle 2 visually, vocally, and/or acoustically, wherein the acoustic/vocal mode is preferred to result in the driver not diverting visual attention away from the road and, hence, to immediately perceive possible dangers and obstacles.

The electronic control unit 5 is programmed to perform three high-level tasks:

learning and storing recurrent low speed manoeuvres performable by the motor vehicle 2 in autonomous driving mode, identifying stored recurrent low speed manoeuvres to propose to the driver for repetition in autonomous driving mode based on the current location of the motor vehicle 2, and repeating (replaying) stored recurrent low speed manoeuvres.

By way of example only, a low speed manoeuvre may be meant as a manoeuvre whose maximum speed does not exceed 30 km/h during storing (whether the motor vehicle 2 starts from standstill or is already moving), and 20 km/h during repetition.

The automotive electronic control unit 5 is programmed to learn both recurrent low speed manoeuvres performed manually by the driver of the motor vehicle 2 and manoeuvres stored in the automotive electronic control unit 5 and performed in autonomous driving mode. The storage in the automotive electronic control unit 5 of a recurrent low speed manoeuvre performed in a certain location may in fact not only be the result of the learning of a recurrent low speed manoeuvre performed manually by the driver of the motor vehicle 2, but also the result of the programming of a recurrent low speed manoeuvre performed by means of a suitable external programming device, or still, of the downloading of a recurrent low speed manoeuvre stored in a remote server in which the same manoeuvre was stored as a result of its learning which took place when such manoeuvre was performed manually by the same driver or by another driver on a different motor vehicle 2.

The automotive electronic control unit 5 is further programmed to store the recurrent low speed manoeuvres in a database of recurrent low speed manoeuvres in the form of descriptive data of the environments in which the recurrent low speed manoeuvres are repeatable in autonomous driving mode, in particular descriptive data of the free spaces available for repetition in autonomous driving mode of recurrent low speed manoeuvres, and conveniently including geolocation data representative of starting and end points of the recurrent low speed manoeuvres, and of spatial constraints, obstacles and associated dimensions, in the environments where the recurrent low speed manoeuvres are repeatable in autonomous driving mode.

Conveniently, moreover, the descriptive data of the environments in which the recurrent low speed manoeuvres are repeatable in autonomous driving mode, stored in the database of recurrent low speed manoeuvres, do not include data indicative of the types of motor vehicles 2 used to perform the recurrent low speed manoeuvres when they were stored, so as to make the descriptive data of the recurrent low speed manoeuvres independent of the types of motor vehicles 2 used to perform them. The database of the recurrent low speed manoeuvres may be stored in the internal memory of the automotive electronic control unit 5 or in a dedicated storage unit externally connected to the automotive electronic control unit 5, and, optionally, automatically duplicated, through an automatic synchronization procedure, in a specific remote repository, for example a remote server, in which it may be shared with other drivers, for example other relatives, who may need to perform the same recurrent low speed manoeuvres.

The automotive electronic control unit 5 is also programmed to store, together with the descriptive data of the environments in which the automotive recurrent low speed manoeuvres are repeatable in autonomous driving mode, identification data of the recurrent low speed manoeuvres so as to allow subsequent identification and automatic or manual selection thereof, for example a descriptive name given to it by the driver of the motor vehicle 2 via the automotive user interface 4 when the learning is completed, and manoeuvre repetition indexes indicative of the number of times the stored recurrent low speed manoeuvres have been repeated in autonomous driving mode.

The automotive electronic control unit 5 is also programmed to cause stored recurrent low speed manoeuvres available for repetition in autonomous driving mode to be selectable both manually by the driver via the automotive user interface 4 and autonomously by the automotive electronic control unit 5 based on the current location of the motor vehicle 2, and identifying the stored recurrent low speed manoeuvre(s) whose geolocation data matches the location of the motor vehicle 2.

In particular, the stored recurrent low speed manoeuvres available for repetition in autonomous driving mode are selectable autonomously by the automotive electronic control unit 5 based on the current location of the motor vehicle 2 by comparing current geolocation data indicative of the current location of the motor vehicle 2 outputted by an on-board satellite geolocation device (GPS, Galileo), or computed by fusing sensory data provided by the on-board sensory system of the motor vehicle 2, for example by ultrasound sensors, surround view cameras, laser scanners, etc., with the geolocation data of the stored recurrent low speed manoeuvres.

The automotive electronic control unit 5 is also programmed to cause a stored recurrent low speed manoeuvre to be repeated in autonomous driving mode in response to a command imparted by the driver of the motor vehicle 2 via the automotive user interface 4, for example in response to operation of a special start button displayed on the on-board display of the motor vehicle 2 or of a personal electronic communications device, or in response to recognition of a specific gesture of the driver of the motor vehicle 2 on the controls of the motor vehicle 2, for example the removal of both hands from the steering wheel and/or of one foot from the accelerator pedal.

The automotive electronic control unit 5 is also programmed to cause a stored recurrent low speed manoeuvre to be repeated in autonomous driving mode by:

first of all, verifying, based on the geolocation data provided by a satellite geolocation device of the motor vehicle 2 and/or of the descriptive data of the recurrent low speed manoeuvre (fixed obstacles and spatial constraints), whether the motor vehicle 2 is where the recurrent low speed manoeuvre is repeatable in autonomous driving mode, not necessarily exactly at the starting point of the recurrent low speed manoeuvre, but also in a neighbourhood of the same, or even in the middle of the path of the recurrent low speed manoeuvre, and then generating, based on the descriptive data of the recurrent low speed manoeuvre and data received from the sensory system of the motor vehicle 2 and indicative of the motion of the motor vehicle 2 and of spatial constraints, obstacles, and associated dimensions, in the environment where the recurrent low speed manoeuvre is to be repeated in autonomous driving mode, appropriate commands to be provided to the automotive on-board systems 3 for repetition of the recurrent low speed manoeuvre in autonomous driving mode.

In an alternative embodiment, the automotive electronic control unit 5 is programmed to cause a recurrent low speed manoeuvre to be repeated in autonomous driving mode by first computing elementary displacements, defined in a given reference system, to be performed by the motor vehicle 2 and then generating, based on the computed elementary displacements and by using known algorithms, specific commands to be provided to the automotive on-board systems 3 in order to repeat the stored recurrent low speed manoeuvre.

The automotive electronic control unit 5 is also programmed to cause the motor vehicle 2 to repeat a stored recurrent low speed manoeuvre in autonomous driving mode by computing in real time, by means of known algorithms, an optimal path to be travelled by the motor vehicle 2 from the starting point to the end point, and the associated longitudinal and lateral dynamics of the motor vehicle 2, taking into account spatial constraints, obstacles, and associated dimensions, in the environment in which the recurrent low speed manoeuvre is to be repeated, both those identified in the environment in which the recurrent low speed manoeuvre is to be repeated in autonomous driving mode when the manoeuvre was stored, and any new spatial constraints and/or obstacles that may have appeared in the environment in which the recurrent low speed manoeuvre is to be repeated in autonomous driving mode subsequent to its storage and which are identifiable based on the data received from the sensory system of the motor vehicle 2.

Therefore, the stored recurrent low speed manoeuvres are not repeated in autonomous driving mode by simply repeating the commands provided to the automotive on-board systems 3 by the drivers of the motor vehicles 2 when the recurrent low speed manoeuvres are stored, but by real-time computing the corresponding optimal paths based on the stored descriptive data of the recurrent low speed manoeuvres and of the data from the sensory systems of the motor vehicles 2.

In this way, the stored recurrent low speed manoeuvres may be repeated, without having to modify or re-store them, even if new constraints and/or new obstacles should appear in the environments in which the manoeuvres are repeatable in autonomous driving mode, and/or the existing ones and/or the associated dimensions should have been modified compared to when the recurrent low speed manoeuvres are stored. Therefore, the appearance of new constraints and/or new obstacles in the environments in which the stored recurrent low speed manoeuvres are repeatable in autonomous driving mode, or the modification of the existing ones and/or the associated dimensions compared to when the recurrent low speed manoeuvres are stored, the computation of the corresponding optimal paths based on the descriptive data of the stored recurrent low speed manoeuvres and of the data from the sensory systems of the motor vehicles 2 causes the recurrent low speed manoeuvres repeatable in autonomous driving mode to be different from the stored ones.

In both embodiments, moreover, the automotive electronic control unit 5 is also conveniently programmed to compute the optimal paths to be travelled by the motor vehicle 2 in autonomous driving mode also taking into account the types of motor vehicles 2 with which the recurrent low speed manoeuvres are repeated in autonomous driving mode, so as to make their repetitions in autonomous driving mode dependent on the types of motor vehicle 2 used to repeat recurrent low speed manoeuvres in autonomous driving mode.

The automotive electronic control unit 5 may also be programmed to allow the driver of the motor vehicle 2, for safety reasons, to exercise a priority manual control during repetitions of the recurrent low speed manoeuvres in autonomous driving mode, for example to react in a timely manner to anomalous situations, such as the appearance of obstacles along the paths. For this purpose, during autonomous driving, the driver of the motor vehicle 2 may be allowed to exercise, without interrupting the repetition of the manoeuvre, an active control at least on the brake and accelerator pedals and on the gear-change, for example to reverse the direction of travel if this is not possible in the autonomous driving mode, and therefore requires intervention of the driver, and/or an active control on the steering wheel, so allowing the interruption of the repetitions of the manoeuvres, depending on whether or not the intervention on the steering wheel is considered to be invasive.

In any case, the automotive electronic control unit 5 is programmed to consider as priority the manual commands given by the driver compared to those from the autonomous driving.

Figure 3:
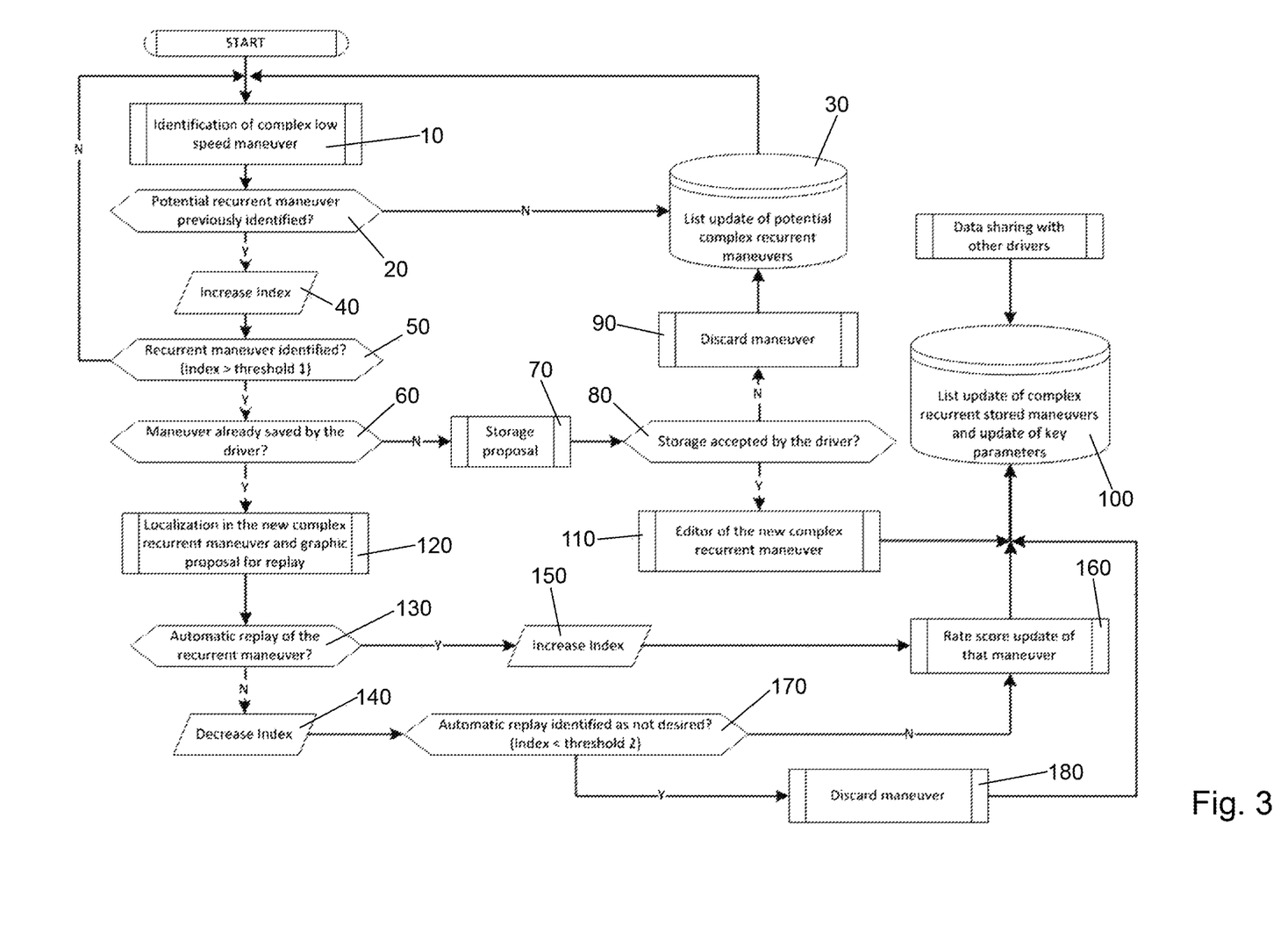
FIG. 3 shows a flow diagram of the operations performed by an automotive electronic control unit in connection with a low speed manoeuvre performed autonomously by a motor vehicle.

The automotive electronic control unit 5 is also programmed to store and populate a database of recurrent low speed manoeuvres by implementing the operations described hereinafter with reference to the flow chart shown in FIG. 3.

In particular, for this purpose, the automotive electronic control unit 5 is programmed to:

determine and store descriptive data of a current manoeuvre of the motor vehicle 2, including, by way of example only:
  a geolocation data of the current manoeuvre of the motor vehicle 2,
  a descriptive data of the environment in which the manoeuvre is performed and, conveniently, comprising geolocation data of a plurality, conveniently three or more, reference points in the environment, for example, as shown in FIG. 1, the pillars of an entrance gate, a tree along the path travelled, etc.,
  time data indicative of either a period of the day or a precise time of the day in which the current manoeuvre is performed,
  data indicative of the number of operations that make up the low speed manoeuvre performed,
  data indicative of the width of the path travelled, and
  speed data indicative of the current speed of the motor vehicle 2 during the manoeuvre;

determine, based on the descriptive data of the current low speed manoeuvre, whether the current low speed manoeuvre of the motor vehicle 2 is either a simple (non-demanding) or a complex (demanding) low speed manoeuvre (block 10), if the current low speed manoeuvre of the motor vehicle 2 is determined to be a complex low speed manoeuvre, determine whether the demanding low speed manoeuvre of the motor vehicle 2 is also a recurrent (habitual) low speed manoeuvre (block 20), if the complex low speed manoeuvre is determined not to be a recurrent low speed manoeuvre, store the complex low speed manoeuvre in a database of complex low speed manoeuvres, in association with a manoeuvre recurrence index conveniently initialized to a unit value (block 30), if, instead, a complex low speed manoeuvre is determined to be a recurrent low speed manoeuvre, increase the manoeuvre recurrence index stored in association with the stored complex low speed manoeuvre (block 40), verify whether the manoeuvre recurrence index stored in association with the complex low speed manoeuvre satisfies a predetermined criterion, for example whether it exceeds a given threshold value (block 50), if the manoeuvre recurrence index stored in association with the complex low speed manoeuvre does not satisfy the aforementioned predetermined criterion, repeat the operations previously described with reference to blocks from 10 to 50, if, instead, the manoeuvre recurrence index stored in association with the complex low speed manoeuvre satisfies the aforementioned predetermined criterion, verify whether the complex low speed manoeuvre is stored in a database of recurrent low speed manoeuvres (block 60), if the complex low speed manoeuvre is determined not to be stored in the database of recurrent low speed manoeuvres, prompt the driver, via the automotive user interface 4, to store the complex low speed manoeuvre in the database of recurrent low speed manoeuvres (block 70) and acquire the driver's selection (block 80), if the prompt to store the complex low speed manoeuvre in the database of recurrent low speed manoeuvres is determined to be refused by the driver, delete the complex low speed manoeuvre from the database of complex low speed manoeuvres (block 90), and if, instead, the prompt to store the complex low speed manoeuvre in the database of recurrent low speed manoeuvres is determined to be accepted by the driver, store the complex low speed manoeuvre in the database of recurrent low speed manoeuvres as a recurrent low speed manoeuvre, in association with a manoeuvre repetition index indicative of the number of times the recurrent low speed manoeuvre has been repeated in autonomous driving mode and conveniently initialized to a unit value (block 100), and conveniently providing the driver with the possibility of editing the descriptive data of the stored recurrent low speed manoeuvre via the automotive user interface 4, for example the geolocation data of the start/end points of the manoeuvre and of the reference points in the environment in which the recurrent low speed manoeuvre takes place, or the speed data, or the descriptive data of the path travelled (optimization of the longitudinal, latitudinal or vertical jerk), or the maximum number of operations that make up the recurrent low speed manoeuvre, in order to improve the comfort of the manoeuvre (block 110).

The determination of whether a current low speed manoeuvre of the motor vehicle 2 is either a simple or complex low speed manoeuvre is conveniently carried out in order to avoid harassing the driver of the motor vehicle 2 with continuous prompts to store and repeat relatively simple current low speed manoeuvres, whose repetition in autonomous driving mode would not bring significant benefits to the driver.

The determination of whether a current low speed manoeuvre is either a simple or complex manoeuvre is based on a proprietary discrimination criterion specifically developed by the automotive manufacturer to achieve a distinguishing performance from those of other automotive manufacturers.

In one embodiment, the discrimination criterion may be based on the cognitive load of the driver, which can be determined based on given automotive quantities.

Therefore, in this embodiment, the automotive electronic control unit 5 is further programmed to:

compute a complexity index I indicative of the complexity of the current low speed manoeuvre, compare the complexity index I with a threshold value, determine that the current low speed manoeuvre is a complex manoeuvre if the complexity index I is higher than or equal to the threshold value, and otherwise determine that the current low speed manoeuvre is a simple manoeuvre.

The complexity index I may be conveniently computed by appropriately weighting k quantities v, according to the following formula:

$$I = \sum_{n=1}^{k} a_n \cdot f_n(v_n)$$

where:

$a_n$ is the weight to be attributed to the nth quantity $v_n$, and $f_n$ is the nth function that can assume a value between 0 and 1 and is based, conveniently, but not necessarily, on the following quantities $v_n$:

longitudinal/lateral/vertical accelerations road slope, changes of direction (and consequently in the number of manoeuvres), action on the steering wheel (variation of the steering wheel angle and the steering wheel angular velocity), action on the brakes (pressure and pressure variation), available path width (free-space) and/or distance to side obstacles, motor vehicle speed, indoor or outdoor environment, and duration of the manoeuvre (minimum and maximum values).

By way of non-limiting example, by indicating:

$v_1$ as the longitudinal acceleration of the motor vehicle, $v_2$ as the number of changes of direction, $$f(v_1) = \begin{cases} 0 & 0 < v_1 < 0.5 \text{ m/s}^2 \\ 0.5 & 0.5 \leq v_1 < 1.5 \text{ m/s}^2 \text{ per almeno 2s} \\ 1 & v_1 \geq 1.5 \text{ m/s}^2 \text{ per almeno 2s} \end{cases}$$

$$f(v_2) = \begin{cases} 0, & v2 < 2 \\ 1, & v2 \geq 2 \end{cases}$$

$$a_1 = 0.7, a_2 = 0.9, k = 2, I_{threshold} = 0.5$$

in the simplified example, the manoeuvre will be considered complex if I>0.5.

The automotive electronic control unit 5 is further programmed to cause the recurrent low speed manoeuvres stored in the database of recurrent low speed manoeuvres to be repeatable in autonomous driving mode by implementing the operations described below, again with reference to the flow chart shown in FIG. 3.

In particular, for this purpose, the automotive electronic control unit 5 is programmed to:

constantly monitor the location of the motor vehicle 2, if in the previously described block 60 a complex low speed manoeuvre is determined to be stored in the database of recurrent low speed manoeuvres, determine availability of a stored recurrent low speed manoeuvre for repetition in autonomous driving mode at the current location of the motor vehicle 2 (block 120), if a stored recurrent low speed manoeuvre is determined to be available for repetition in autonomous driving mode at the current position of the motor vehicle 2, prompt the driver, via the automotive user interface 4, to repeat in autonomous driving mode the available stored recurrent low speed manoeuvre (block 120) and acquire the driver's selection (block 130), if the driver refuses, via the automotive user interface 4, the proposal to repeat in autonomous driving mode the stored recurrent low speed manoeuvre available for repetition in autonomous driving mode, decrease the manoeuvre repetition index stored in association with the stored recurrent low speed manoeuvre available for repetition in autonomous driving mode (140), and if the prompt to repeat in autonomous driving mode the available stored recurrent low speed manoeuvre is determined to be refused by the driver via the automotive user interface 4, increase the manoeuvre repetition index stored in association with the available stored recurrent low speed manoeuvre (block 150) and update the database of recurrent low speed manoeuvres accordingly (block 160).

If the prompt to repeat in autonomous driving mode the available stored recurrent low speed manoeuvre is determined to be accepted by the driver, the automotive electronic control unit 5 is further programmed to:

cause the available stored recurrent low speed manoeuvre to be repeated in autonomous driving mode as described above, and cause a sketch of the recurrent low speed manoeuvre to be repeated and of the environment in which it is to be repeated to be displayed on the on-board display of the motor vehicle 2 or of a user's personal electronic communication device.

If the prompt to repeat in autonomous driving mode the available stored recurrent low speed manoeuvre is determined to be refused by the driver, the automotive electronic control unit 5 is further programmed to:

verify whether the manoeuvre repetition index stored in association with the stored recurrent low speed manoeuvre available for repetition in autonomous driving mode satisfies a predetermined criterion, for example whether the manoeuvre repetition index is lower than a given threshold value (block 170), and if the manoeuvre repetition index stored in association with the stored recurrent low speed manoeuvre available for repetition in autonomous driving mode satisfies the predetermined criterion, delete the recurrent low speed manoeuvre from the database of recurrent low speed manoeuvres (block 180).

If several stored recurrent low speed manoeuvres are available for repetition in autonomous driving mode at the current location of the motor vehicle 2, the automotive electronic control unit 5 is further programmed to:

prompt the driver, via the automotive user interface 4, to repeat in autonomous driving mode the available stored recurrent low speed manoeuvres by displaying them in descending order of manoeuvre repetition index, whereby the available stored recurrent low speed manoeuvre with the highest manoeuvre repetition index is the first in the order, allow the driver to select, via the automotive user interface 4, one of the recurrent low speed manoeuvres prompted for repetition in autonomous driving mode, and cause the selected stored recurrent low speed manoeuvre to be repeated in autonomous driving mode in response to the driver's selection.

Lastly, the automotive electronic control unit 5 is programmed to:

perform a smart transition between manual driving and autonomous driving of the motor vehicle 2 to execute a demanding and recurrent low speed manoeuvre by suitably controlling the longitudinal dynamics or the lateral dynamics of the motor vehicle 2, or both, enable the repetition in automatic driving mode of a demanding and recurrent low speed manoeuvre recognized on the basis of quantities indicative of the longitudinal and lateral dynamics of the motor vehicle 2, such as, for example:

Longitudinal
    accelerator pedal
    brake pedal
    engine torque Lateral
    steering wheel angle
    steering wheel velocity
    Yaw rate
    torque steer so as to enter and exit the repetition in automatic driving mode of a demanding and recurrent low speed manoeuvre without requiring the implementation of specific buttons, for example entering the repetition in automatic driving mode of a demanding and recurrent low speed manoeuvre by releasing the accelerator and brake pedals and the steering wheel, and exiting the repetition in automatic driving mode of a demanding and recurrent low speed manoeuvre when an action of the driver on the accelerator pedal, the brake pedal or the steering wheel is detected, and perform a smart management of the conditions of override, pause and abortion of the repetition in autonomous driving mode of a recurrent low speed manoeuvre.

The advantages enabled by the automotive autonomous driving system according to the present invention will be apparent from an examination of the features thereof.

In particular, it allows even unexperienced drivers to significantly reduce the time taken to reach the intended destination and the possibility of making mistakes during recurrent low speed manoeuvres to be performed along predefined paths in limited and controlled areas.

The automotive autonomous driving system according to the present invention may be applied to any type of motor vehicle, without the need for complex structural modifications, since it uses sensors and actuators normally already provided on board the motor vehicles, and used for autonomous driving of a motor vehicle in any area, without the provision of mechanical driving means, such as a rail, to drive the motor vehicle along a predefined path.

The automotive autonomous driving system of a motor vehicle is configurable and can be easily adapted to and used in several types of situations, from the less complex, for example a private courtyard, to the more complex ones (for example a hub complex for freight loading/unloading to make docking manoeuvres efficient, fast and safe).

Finally, it is clear that modifications and variations can be made to what is described and illustrated herein, without thereby departing from the scope of protection of the present invention, as defined in the appended claims.

In particular, it is clear that, depending on how the automotive autonomous driving system is configured, the driving may be completely autonomous or only partially autonomous; for example, the driver may be left in charge of controlling the brake and accelerator pedals, limiting the autonomous action to the steering control only.

Furthermore, it is clear that the procedure for manually defining and programming recurrent low speed manoeuvres may involve the learning and storing of a plurality of predefined manoeuvres in the storage device, with the possibility for the user to select the desired manoeuvre among those stored, recognizing it through the code or the associated identification category, for example parking at home, passing through a narrow alley, multi-storey parking circular ramps, approaching a tollbooth, etc.

The stored recurrent low speed manoeuvres can also include reverse manoeuvres for returning to the starting point from the arrival point, suitably modified to reverse the direction of travel of the motor vehicle. Alternatively, the reverse trajectories could be calculated by the electronic control unit, through appropriate processing.

The invention claimed is:

1. An automotive electronic control unit configured to be connected to automotive on-board systems of a motor vehicle including a propulsion system, a braking system, a steering system, a sensory system, and an automotive user interface by way of an automotive on-board communications network, and configured to cooperate with the automotive on-board systems to provide an automotive autonomous driving system, the automotive electronic control unit comprising:
   non-transitory computer readable media configured to:
      store a database of recurrent low speed maneuvers and instruct the automotive on-board systems to perform the recurrent low speed maneuvers stored in the database of recurrent low speed maneuvers to be executed in an autonomous driving mode;
      populate the database of recurrent low speed maneuvers by determining and storing descriptive data of a current low speed maneuver of the motor vehicle;
      determining whether the current low speed maneuver is simple or complex by: computing a complexity index (I) indicative of a complexity of the current low speed maneuver of the motor vehicle; comparing the complexity index (I) with a threshold value; determining the current low speed maneuver of the motor vehicle as a complex maneuver if the complexity index (I) is higher than, or equal to, the threshold value; and determining the current low speed maneuver of the motor vehicle as a simple maneuver if the complexity index (I) is lower than the threshold value;
      if the current low speed maneuver is determined to be a complex low speed maneuver, determining whether the complex low speed maneuver is also a recurrent low speed maneuver;
      if the complex low speed maneuver is determined to not be a recurrent low speed maneuver, storing the complex low speed maneuver in a database of complex, non-recurrent, low speed maneuvers, in association with a maneuver recurrence index;
      if, instead, the complex low speed maneuver is determined to be a recurrent low speed maneuver, updating the maneuver recurrence index stored in association with the complex low speed maneuver;
      verify whether the maneuver recurrence index stored in association with the complex low speed maneuver satisfies a predetermined criterion;
      if the maneuver recurrence index stored in association with the complex low speed maneuver is determined to satisfy the aforementioned predetermined criterion, verify whether the complex low speed maneuver is stored in the database of recurrent low speed maneuvers;
      if the complex low speed maneuver is determined not to be stored in the database of recurrent low speed maneuvers, prompt the driver, via the automotive user interface, to store the complex low speed maneuver in the database of recurrent low speed maneuvers;
      if the prompt to store the complex low speed maneuver in the database of recurrent low speed maneuvers is determined to be accepted by the driver via the automotive user interface, store the complex low speed maneuver in the database of recurrent low speed maneuvers in association with a maneuver repetition index;
      store the recurrent low speed maneuvers in the database of recurrent low speed maneuvers in the form of descriptive data of the environments in which the recurrent low speed maneuvers are repeatable in autonomous driving mode, including geolocation data representative of a starting point and an end point of the recurrent low speed maneuvers, and of spatial constraints, obstacles and associated dimensions in the environments where recurrent low speed maneuvers will be repeated in the autonomous driving mode;
      cause a stored, recurrent low speed maneuver stored in the database of recurrent low speed maneuvers to be repeated in the autonomous driving mode by:
         computing an autonomous driving path to be travelled by the motor vehicle from the starting point to the end point, and associated longitudinal and lateral dynamics of the motor vehicle, based on associated stored geolocation data and on data received from the sensory system of the motor vehicle, whereby taking account of the spatial constraints, obstacles, and associated dimensions, in the environment in which the recurrent low speed maneuver is repeatable in autonomous driving mode and identified when the maneuver was stored, and any new spatial constraints and/or obstacles that appeared in the environment in which the recurrent low speed maneuver is repeatable in the autonomous driving mode subsequently to when the maneuver was stored and which are identifiable based on the data received from the automotive sensory system; and
         computing, based on the computed autonomous driving path, commands to be provided to the autonomous driving system of the motor vehicle to cause the recurrent low speed maneuvers to be repeated in the autonomous driving mode.

2. The automotive electronic control unit of claim 1, wherein the descriptive data of the environments in which the recurrent low speed maneuvers are repeated in the autonomous driving mode, stored in the database of recurrent low speed maneuvers, does not include data indicative of the types of motor vehicles used to perform the recurrent low speed maneuvers when they were stored, so as to make the descriptive data of the stored recurrent low speed maneuvers independent of the types of motor vehicles used to perform the recurrent low speed maneuvers.

3. The automotive electronic control unit of claim 1, further configured to compute autonomous driving paths to be travelled by the motor vehicles in the autonomous driving mode and associated longitudinal and lateral dynamics of the motor vehicles, taking also account of the types of motor vehicles with which the recurrent low speed maneuvers are repeatable in the autonomous driving mode, so as to cause the repetitions in the autonomous driving mode of the recurrent low speed maneuvers stored in the database of recurrent low speed maneuvers to be dependent on the types of motor vehicles with which the recurrent low speed maneuvers are repeatable in the autonomous driving mode.

4. The automotive electronic control unit of claim 1, further configured to cause the recurrent low speed maneuvers stored in the database of recurrent low speed maneuvers to be repeatable in the autonomous driving mode by:
- determining availability of a stored recurrent low speed maneuver for repetition in the autonomous driving mode at the current motor vehicle location;
- if a stored recurrent low speed maneuver is determined to be available for repetition in the autonomous driving mode at the current position of the motor vehicle, causing the driver to be prompted, via the automotive user interface, to repeat in the autonomous driving mode the available stored recurrent low speed maneuver;
- if the prompt to repeat in the autonomous driving mode the available stored recurrent low speed maneuver is determined to be refused by the driver via the automotive user interface, decreasing the maneuver repetition index stored in association with the available stored recurrent low speed maneuver; and
- if the prompt to repeat in the autonomous driving mode the available stored recurrent low speed maneuver is determined to be accepted by the driver via the automotive user interface, increasing the maneuver repetition index stored in association with the available stored recurrent low speed maneuver.

5. The automotive electronic control unit of claim 4, further configured to, if the prompt to repeat in the autonomous driving mode the available stored recurrent low speed maneuver is determined to be refused by the driver via the automotive user interface:
- verify whether the maneuver repetition index stored in association with the available stored recurrent low speed maneuver satisfies a predetermined criterion; and
- if the maneuver repetition index stored in association with the available stored recurrent low speed maneuver is determined to satisfy the predetermined criterion, delete the recurrent low speed manoeuvre from the database of recurrent low speed maneuvers.

6. The automotive electronic control unit of claim 4, further configured to, if the prompt to repeat in the autonomous driving mode the available stored recurrent low speed maneuver is determined to be accepted by the driver via the automotive user interface, cause the available stored recurrent low speed maneuver to be repeated in the autonomous driving mode, and a sketch of the recurrent low speed maneuver to be repeated in the autonomous driving mode and of the surrounding environment to be displayed on a display of the automotive user interface.

7. The automotive electronic control unit of claim 4, further configured to, if several stored recurrent low speed maneuvers are determined to be available for repetition in the autonomous driving mode at the current position of the motor vehicle:
- cause the driver to be prompted, via the automotive user interface, to repeat in the autonomous driving mode the available stored recurrent low speed maneuvers by displaying them in descending order of the maneuver repetition index, whereby the available stored recurrent low speed maneuver with the highest maneuver repetition index is the first in the order;
- allow the driver to select, via the automotive user interface, one of the recurrent low speed maneuvers available for repetition in the autonomous driving mode; and
- cause the selected stored recurrent low speed maneuver to be repeated in the autonomous driving mode in response to the driver's selection.

8. The automotive electronic control unit of claim 1, wherein the descriptive data of a current maneuver of the motor vehicle includes the following:
- geolocation data of the current maneuver;
- descriptive data of the environment in which the current maneuver is being performed including geolocation data of a plurality of reference points in the environment;
- time data indicative of either a period of the day or a time of the day in which the current maneuver is being performed;
- data indicative of the number of operations that make up the current maneuver;
- data indicative of the width of the path travelled by the motor vehicle during the current maneuver; and
- data indicative of the speed of the motor vehicle during the current maneuver.

9. The automotive electronic control unit of claim 1, wherein determining whether the current low speed maneuver is simple or complex is further based on the descriptive data of the current low speed maneuver and on a given discrimination criterion, the discrimination criterion is based on a cognitive load of the driver during the current maneuver of the motor vehicle and is determinable based on automotive quantities.

10. The automotive electronic control unit of claim 9,
wherein the complexity index (I) is computable based on one or more of the following quantities:
- motor vehicle longitudinal/lateral/vertical accelerations;
- road slope;
- changes of direction (and consequently number of maneuvers);
- action on the steering wheel (variation of the steering wheel angle and the steering wheel angular velocity);
- action on the brakes (pressure and pressure variation);
- available path width (free-space) and/or distance to side obstacles, motor vehicle speed;
- indoor or outdoor environment; and
- duration of the maneuver (minimum and maximum values).

11. The automotive electronic control unit of claim 10, further configured to compute the complexity index (I) by weighting k of the aforementioned quantities v, according to the following formula:

$$I = \sum_{n=1}^{k} a_n \cdot f_n(v_n)$$

where:
$a_n$ is the weight to be attributed to the nth $v_n$ quantity, and
$f_n$ is the nth function that can assume a value between 0 and 1.

12. The automotive electronic control unit of claim 1,
wherein the automotive electronic control unit is connected to the automotive on-board systems and the automotive user interface via the automotive on-board communications network and is in cooperation with the automotive on-board systems to provide the automotive autonomous driving system.

13. The automotive electronic control unit of claim 12, wherein the automotive autonomous driving system including the automotive electronic control unit is installed in the motor vehicle.

* * * * *